United States Patent
Yuan et al.

(10) Patent No.: US 10,097,375 B2
(45) Date of Patent: Oct. 9, 2018

(54) ELECTRONIC DEVICE AND TRANSMISSION METHOD THEREOF

(71) Applicant: Chicony Electronics Co., Ltd., New Taipei (TW)

(72) Inventors: Shang-Yuan Yuan, New Taipei (TW); Chien-Yu Chen, New Taipei (TW)

(73) Assignee: Chicony Electronics Co., Ltd., New Taipei (TW)

(*) Notice: Subject to any disclaimer, the term of this patent is extended or adjusted under 35 U.S.C. 154(b) by 93 days.

(21) Appl. No.: 15/214,474

(22) Filed: Jul. 20, 2016

(65) Prior Publication Data

US 2017/0264543 A1    Sep. 14, 2017

(30) Foreign Application Priority Data

Mar. 9, 2016 (CN) .......................... 2016 1 0133687

(51) Int. Cl.
| | |
|---|---|
| *H04L 12/46* | (2006.01) |
| *H04L 12/741* | (2013.01) |
| *H04L 12/715* | (2013.01) |
| *H04W 40/20* | (2009.01) |
| *H04L 12/755* | (2013.01) |
| *H04W 84/12* | (2009.01) |

(52) U.S. Cl.
CPC ........ *H04L 12/4641* (2013.01); *H04L 45/021* (2013.01); *H04L 45/04* (2013.01); *H04L 45/74* (2013.01); *H04W 40/20* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2003/0046397 A1* | 3/2003 | Trace | H04L 12/2856 709/227 |
| 2009/0113031 A1* | 4/2009 | Ruan | H04L 41/00 709/223 |
| 2015/0188810 A1* | 7/2015 | Salkintzis | H04W 80/04 370/328 |
| 2016/0072638 A1* | 3/2016 | Amer | H04L 12/2818 398/106 |
| 2017/0223508 A1* | 8/2017 | Gordon | H04W 4/028 |
| 2017/0302535 A1* | 10/2017 | Lee | H04L 41/12 |

* cited by examiner

*Primary Examiner* — Saba Tsegaye
(74) *Attorney, Agent, or Firm* — CKC & Partners Co., Ltd.

(57) ABSTRACT

An electronic device and a transmission method thereof are disclosed. The transmission method includes the following steps: establishing a virtual private network (VPN) and establishing an initial routing table corresponding to the virtual private network; receiving a packet and obtaining a network destination of the packet; determining whether the network destination is directed to a host located in an internal network; and transmitting the packet directly according to a first process or revising the initial routing table to generate an updated routing table and then transmitting the packet according to the updated routing table if it is determined that the network destination is not directed to the host located in the internal network. Thus, the electronic device is allowed to automatically select the suitable routing path depending on operating situations.

17 Claims, 3 Drawing Sheets

ELECTRONIC DEVICE AND TRANSMISSION METHOD THEREOF

RELATED APPLICATIONS

This application claims priority to China Application Serial Number 201610133687.5, filed Mar. 9, 2016, which is herein incorporated by reference.

BACKGROUND

Field of Invention

The present invention relates to an electronic device and a transmission method thereof. More particularly, the present invention relates to an electronic device and a transmission method thereof using a virtual private network (VPN).

Description of Related Art

Android is an operation system developed based on Linux kernel, which is mainly designed for mobile devices, such as smart mobile devices and tablet computers. Android adopts the software stack architecture, and Linux kernel operates to serve as a basis at its lowest level for providing basic functions. Other application programs are developed by various companies themselves. Therefore, developers can develop mobile devices having different application programs or different user interfaces depending on users' requirements, thus making the applications of mobile devices versatile.

However, how to make the mobile devices or tablet computers running Android operation system more conveniently select a suitable transmission method has become a problem that the industry is eager to solve.

For the foregoing reasons, there is a need to solve the above-mentioned problem by providing an electronic device and a transmission method thereof.

SUMMARY

A transmission method is provided. The transmission method comprises the following steps: establishing a virtual private network (VPN) and establishing an initial routing table corresponding to the virtual private network; receiving a packet and obtaining a network destination of the packet; determining whether the network destination is directed to a host located in an internal network; and transmitting the packet directly according to a first process or revising the initial routing table to generate an updated routing table and then transmitting the packet according to the updated routing table if it is determined that the network destination is not directed to the host located in the internal network.

In the foregoing, when the electronic device is connected both to a Wi-Fi network and to a mobile network, the electronic device selects to transmit the packet through the mobile network.

In the foregoing, the electronic device transmits the packet to a multimedia database through a Wi-Fi network.

In the foregoing, the transmission method further comprises the following steps after the step of receiving the packet and obtaining the network destination of the packet: determining whether the network destination exists in the initial routing table; determining whether the network destination is directed to the host located in the internal network if it is determined that the network destination does not exist in the initial routing table; and transmitting the packet directly according to a routing path recorded in the updated routing table if it is determined that the network destination exists in the initial routing table, wherein the routing path comprises designating a Wi-Fi network or a mobile network to transmit the packet.

In the foregoing, the transmission method further comprises the following steps after the step of determining whether the network destination is directed to the host located in the internal network: revising the initial routing table to generate the updated routing table and designating that the packet is transmitted to the network destination through the mobile network by using the updated routing table if it is determined that the network destination is not directed to the host located in the internal network; and revising the initial routing table to generate the updated routing table and designating that the packet is transmitted to the network destination through the Wi-Fi network by using the updated routing table if it is determined that the network destination is directed to the host located in the internal network.

In the foregoing, the step of receiving the packet and obtaining the network destination of the packet further comprises: reading a header of the packet to obtain the network destination after receiving the packet.

In the foregoing, the transmission method further comprises the following step before the step of receiving the packet and obtaining the network destination of the packet: adding the header to the packet, wherein the header provides the network destination.

In the foregoing, the transmission method further comprises the following steps after the step of establishing the virtual private network and establishing the initial routing table corresponding to the virtual private network: designating the first process as transmitting the packet through a mobile network; and designating a second process as transmitting the packet through a Wi-Fi network.

In the foregoing, the packet is designated to the first process and the first process is performed to transmit the packet if it is determined that the network destination is not directed to the host located in the internal network; and the packet is designated to the second process and the second process is performed to transmit the packet if it is determined that the network destination is directed to the host located in the internal network.

The invention provides an electronic device. The electronic device comprises a virtual private network module and a packet receiving module. The virtual private network module is configured to establish a virtual private network (VPN) and establish an initial routing table corresponding to the virtual private network. The packet receiving module is configured to receive a packet and obtain a network destination of the packet, and transmit the packet and the network destination to the virtual private network module. The virtual private network module determines whether the network destination is directed to a host located in an internal network. The virtual private network module transmits the packet according to a first process directly or the virtual private network module revises the initial routing table to generate an updated routing table and then transmits the packet according to the updated routing table if it is determined that the network destination is not directed to the host located in the internal network.

In the foregoing, when the virtual private network module is connected both to a Wi-Fi network and a mobile network, the electronic device selects to transmit the packet through the mobile network.

In the foregoing, the virtual private network module transmits the packet to a multimedia database through a Wi-Fi network.

In the foregoing, the virtual private network module is further configured to determine whether the network destination exists in the initial routing table. The virtual private network module determines whether the network destination is directed to the host located in the internal network if it is determined that the network destination does not exist in the initial routing table; and the virtual private network module transmits the packet according to a routing path recorded in the updated routing table directly if it is determined that the network destination exists in the initial routing table, wherein the routing path comprises designating a Wi-Fi network or a mobile network to transmit the packet.

In the foregoing, the virtual private network module revises the initial routing table to generate the updated routing table and designates that the packet is transmitted to the network destination through the mobile network by using the updated routing table if it is determined that the network destination is not directed to the host located in the internal network; and the virtual private network module revises the initial routing table to generate the updated routing table and designates that the packet is transmitted to the network destination through the Wi-Fi network by using the updated routing table if it is determined that the network destination is directed to the host located in the internal network.

In the foregoing, the packet receiving module is further configured to read a header of the packet to obtain the network destination.

In the foregoing, the virtual private network module is further configured to designate the first process as transmitting the packet through a mobile network, and to designate a second process as transmitting the packet through a Wi-Fi network.

In the foregoing, the virtual private network module designates the packet to the first process and performs the first process to transmit the packet if it is determined that the network destination is not directed to the host located in the internal network; and the virtual private network module designates the packet to the second process and performs the second process to transmit the packet if it is determined that the network destination is directed to the host located in the internal network.

In summary, the technical solution of the present invention has obvious advantages and beneficial effects as compared with the prior art. Through the above technical solution, considerable advances in technology and extensive industrial applicability can be achieved. The electronic device can conveniently select the suitable transmission method through using the virtual private network according to the present disclosure.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
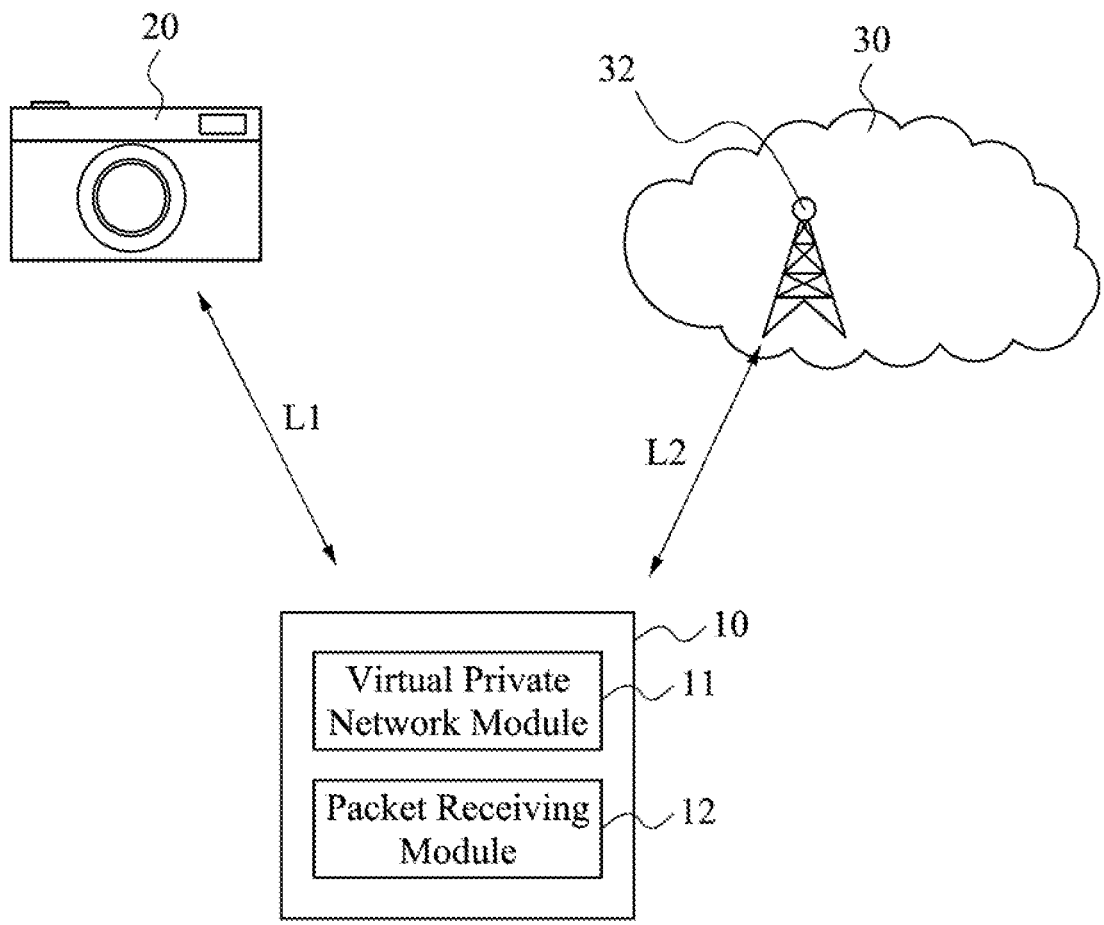
FIG. 1 depicts a schematic diagram of an electronic device applied to a transmission system according to one embodiment of this invention.

Reference will now be made in detail to the present embodiments of the invention, examples of which are illustrated in the accompanying drawings. However, the embodiments provided herein are intended as illustrative only since numerous modifications and variations therein will be apparent to those skilled in the art. Description of the operation does not intend to limit the operation sequence. Any structures resulting from recombination of devices with equivalent effects are within the scope of the present invention. In addition, drawings are only for the purpose of illustration and not plotted according to the original size. Wherever possible, the same reference numbers are used in the drawings and the description to refer to the same or like parts.

Furthermore, it should be understood that the terms, "comprising", "including", "having", "containing", "involving" and the like, used herein are open-ended, that is, including but not limited to.

A description is provided with reference to FIG. 1. FIG. 1 depicts a schematic diagram of an electronic device applied to a transmission system according to one embodiment of this invention. As shown in FIG. 1, an electronic device 10 may be a mobile device, such as a cell phone, a tablet computer, or a notebook computer. An electronic device 20 may be a device having a multimedia database, such as a digital camera, an electronic picture frame, a computer, or a mobile device having a multimedia database.

To simplify matters, the electronic device 10 is regarded as a mobile device and the electronic device 20 is regarded as a digital camera in the description of the following embodiments, however, those of ordinary skill in the art would understand that the electronic device 10 is not limited to be implemented by a mobile device and the electronic device 20 is not limited to be implemented by a digital camera. The electronic device 20 can be a device having a local area network (LAN) connection ability, such as a sports camera, a multimedia database, or a portable hard disk.

As shown in FIG. 1, the mobile device 10 can access data from the digital camera 20 through a Wi-Fi network L1. The mobile device 10 runs Android operation system.

In addition, in one embodiment, a mobile network L2 shown in FIG. 1 is, for example, a communication method, such as a third generation telecommunication (3G) technology, a fourth generation telecommunication (4G) technology, a long term evolution (LTE) technology, and the like.

In one embodiment, the digital camera 20 has a Wi-Fi network sharing function. The digital camera 20 can share photos with or transmit video streaming to the mobile device 10 or receive a control instruction (such as a shutter instruction, a selfie instruction, a camera setting change instruction) from the mobile device 10 through the Wi-Fi network L1. In practical applications, when the Wi-Fi network sharing function of the digital camera 20 is turned on, the digital camera 20 will serve as a Wi-Fi access point (AP). At this time, the mobile device 10 can access various kinds of photo/video information from the digital camera 20 or transmit instructions to the digital camera 20 through the Wi-Fi network L1.

Generally speaking, when the mobile device 10 establishes a connection to the digital camera 20 through the Wi-Fi network L1, the mobile device 10 may regard the digital camera 20 as a transmission gateway connected to an external network. Under some circumstances, when the mobile device 10 simultaneously establishes both the Wi-Fi network L1 and the mobile network L2, the mobile device 10 may be preset to use the Wi-Fi network L1 as means for connecting to an external network.

It is worth noting that, the digital camera 20 by itself does not have a communication ability to be directly connected to the external network in some embodiments. That is, the digital camera 20 is not equipped with a GSM, a 3G, or a 4G communication network module, or the like, so that it can not be directly connected to the Internet. Hence, when the mobile device 10 is connected to the digital camera 20 through the Wi-Fi network L1, the mobile device 10 can not be further connected to the external network 30 through the digital camera 20 which is not able to serve as a gateway. For example, the external network herein refers to the Internet. If the mobile device 10 uses the Wi-Fi network L1 as a transmission path for sending packets to the external network 30, the packets to be sent possibly can not be successfully delivered.

Therefore, the present disclosure provides the following transmission method to allow the mobile device 10 to transmit data by automatically selecting the Wi-Fi network L1 or the mobile network L2 under different circumstances.

Figure 2:
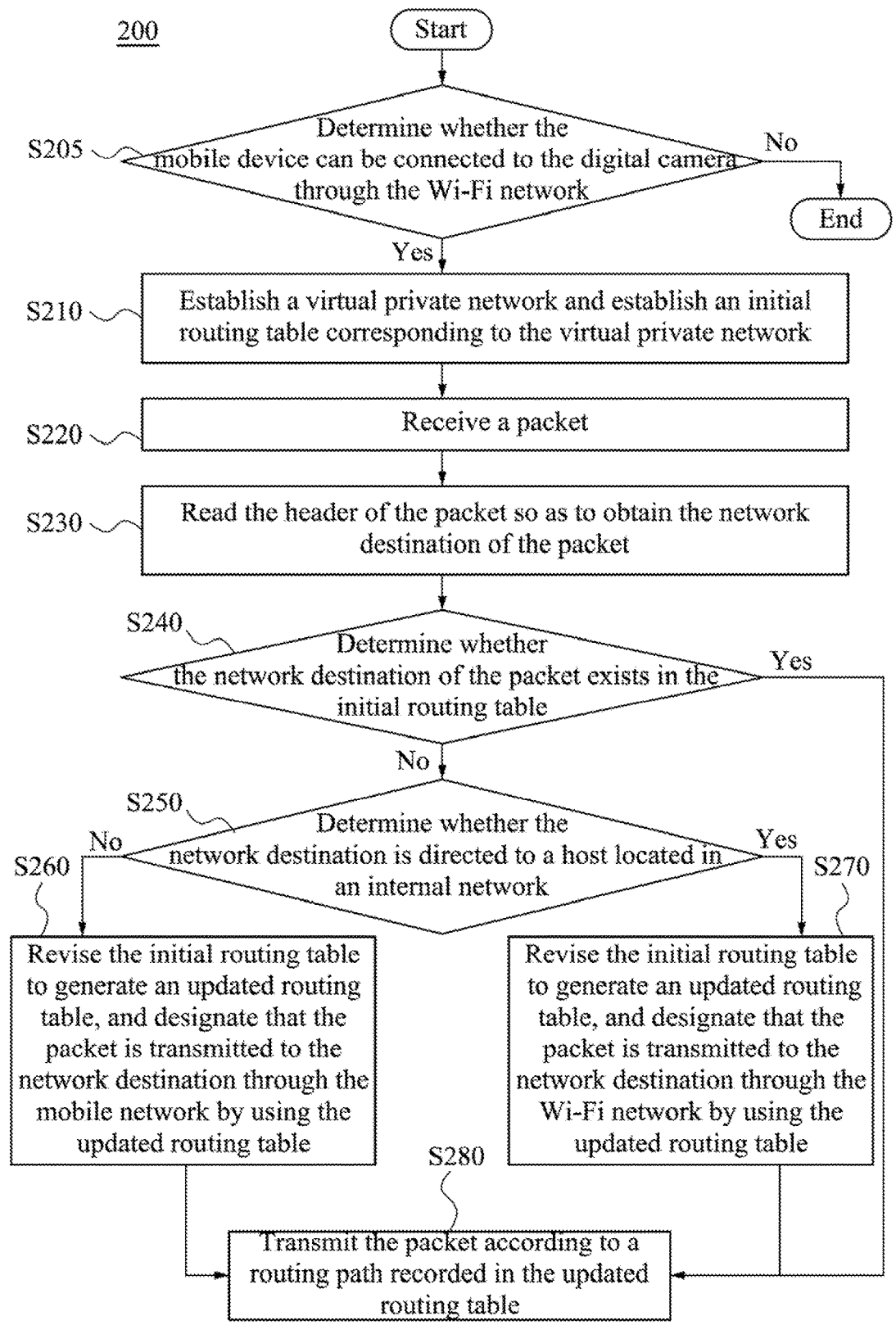
FIG. 2 depicts a flowchart of a transmission method according to one embodiment of this invention.

A description is provided with reference to FIG. 2. FIG. 2 depicts a flowchart of a transmission method 200 according to one embodiment of this invention. In one embodiment, the mobile device 10 comprises a virtual private network module 11 and a packet receiving module 12. In one embodiment, the virtual private network module 11 can be implemented by using application software. The virtual private network module 11 is configured to establish a virtual private network (VPN) or serve as a firewall on the mobile device 10 so as to collect all of the received data or data to be transmitted on the mobile device. In one embodiment, one or more application programs in the mobile device 10 can only realize the data transmission or receiving through the virtual private network. In addition, the virtual private network module 11 can be configured to filter or block part of the data. For example, the virtual private network module 11 can block the mobile device 10 from receiving advertising in a specific application program. In another embodiment, the virtual private network module 11 and the packet receiving module 12 together or respectively can be implemented by a microcontroller unit, a microprocessor, a digital signal processor, an application specific integrated circuit (ASIC), or a logic circuit.

In step S205, the virtual private network module 11 determines whether the mobile device 10 can be connected to the digital camera 20 through the Wi-Fi network L1. If yes, step S210 is then performed. If not, the transmission method 200 ends.

In one embodiment, when the digital camera 20 by itself does not have the communication ability to be directly connected to the external network 30, the mobile device 10 still can be connected to the digital camera 20 through the Wi-Fi network L1 to form an internal network. Under the circumstances, the mobile device 10 can exchange data with the digital camera 20 through the Wi-Fi network L1 but cannot be connected to the external network 30 through the digital camera 20. Under other circumstances, when the digital camera 20 by itself has the communication ability to be directly connected to the external network 30, the virtual private network module 11 determines that the mobile device 10 can be connected to the digital camera 20 through the Wi-Fi network L1 and that the mobile device 10 can be connected to the external network 30 through the digital camera 20.

In step S210, the virtual private network module 11 is configured to establish a virtual private network and establish an initial routing table corresponding to the virtual private network. The virtual private network may be a private network (also called an intranet) applied to homes or enterprises. For example, the digital camera 20 and the mobile device 10 in FIG. 1 may be two nodes of the private network.

In one embodiment, when the virtual private network module 11 establishes the virtual private network, the initial routing table will be generated. The initial routing table can be used for recording relevant information of packets. For example, the initial routing table comprises information, such as a network destination, a destination netmask, a gateway, a current interface, and metric, etc. The gateway is used for designating that the packet is sent to which interface of the next router. The current interface designates that the packet is sent by which interface of the current router. The metric represents a number of routers that the packet needs to pass for reaching the network destination. The virtual private network module 11 can obtain a routing path of a newly received packet by reading the initial routing table after establishing the initial routing table.

It is noted that in step S210, when the one or more application programs in the mobile device 10 need to transmit data, the one or more application programs may be set to only be able to transmit the data through the virtual private network module 11. Hence, the mobile device 10 can collect and filter the data from various application programs by the virtual private network module 11.

In one embodiment, the mobile device 10 may be set such that when the mobile device 10 receives data from some specific IP (Internet Protocol) addresses, the data needs to be sent to the virtual private network for filtering. On the contrary, it is not necessary to send the received data that does not come from these specific IP addresses to the virtual private network for filtering.

In another embodiment, the mobile device 10 may be set such that when the mobile device 10 determines that data is transmitted from an IP address within a specific range (for example, the IP address can ranges from http://192.168.100 to http://192.168.200) to the mobile device 10, the data needs to pass the virtual private network for filtering and the mobile device 10 determines to transmit the data to a next server node according to the basic operational rules of TCP/IP protocol by looking up the initial routing table.

In step S220, the packet receiving module 12 is configured to receive a packet.

In one embodiment, in order to simulate a point-to-point connection by the virtual private network, the mobile device 10 will encapsulate or package all the data to be transmitted firstly and add a header to provide routing information, so that the data can reach the network destination through a shared network or a public network.

Therefore, when the one or more application programs in the mobile device 10 need to transmit data, the data can be processed and consolidated into one or more packets and the one or more packets are transmitted to the packet receiving module 12 in the mobile device 10.

In step S230, the packet receiving module 12 is configured to read the header of the packet so as to obtain the network destination of the packet, and transmit the packet and the network destination to the virtual private network module 11. Hence, when the packet receiving module 12 in the mobile device 10 receives a packet of some other application program in the mobile device 10, the packet receiving module 12 can read the header of the packet to obtain the network destination of the packet. In one embodiment, the transmission method 200 may selectively comprise step S240. In another embodiment, the transmission method 200 may omit step S240 after step S230 and directly go to step S250 depending on practical applications.

In step S240, the virtual private network module 11 determines whether the network destination of the packet exists in the initial routing table. If it is determined that the network destination of the packet exists in the initial routing table, step S250 is performed. If it is determined that the network destination of the packet does not in the initial routing table, step S280 is performed.

For example, when the virtual private network module 11 receives the network destination of the packet directed to the digital camera 20 for the first time and the network destination of the packet does not exist in the routing table, the virtual private network module 11 designates a routing path of the packet to the Wi-Fi network L1 and revises the initial routing table according to the network destination and the designated routing path of the packet so as to generate an updated routing table. After performing step S280, if the virtual private network module 11 receives the network destination of the packet directed to the digital camera 20 again, the packet will not enter into the virtual private network again because the network destination has already existed in the routing table; and the packet is transmitted to the digital camera 20 through the Wi-Fi network L1 directly according to the updated routing table.

Thus, only when the virtual private network module 11 determines that the network destination of the packet does not exist in the initial routing table does the transmission method 200 go to step S250. In this manner, the computation amount of the mobile device 10 is reduced.

In step S250, the virtual private network module 11 determines whether the network destination is directed to a host located in an internal network. If it is determined that the network destination is directed to the host located in the internal network, step S270 is performed. If it is determined that the network destination is not directed to the host located in the internal network, step S260 is performed.

In one embodiment, as compared with the internal network (such as the Wi-Fi network L1 between the mobile device 10 and the digital camera 20), the external network 30 may refer to the Internet. The virtual private network module 11 can determine whether the packet is designated to be transmitted to a base station 32 of the external network 30 or the digital camera 20 in the internal network by analyzing the network destination of the packet. For example, the network destination (or IP address) of a current packet is http://192.168.123, and an IP address of the internal network has been defined as a network segment from http://192.168.100 to http://192.168.200 in advance. It is thus understood that the network destination of the current packet falls into a range of the IP address of the internal network, the virtual private network module 11 thus determines that the network destination of the current packet is directed to the host (such as the digital camera 20) of the internal network. Conversely, if the network destination (or IP address) of the current packet is http://64.233.161.104, the network destination of the current packet does not fall into the range of the IP address of the internal network. The virtual private network module 11 thus determines that the network destination of the current packet is not directed to the host of the internal network (that is, the virtual private network module 11 determines that the network destination of current packet is possibly directed to the external network 30).

In the manner, in step S250, the virtual private network module 11 can analyze whether the packet is designated to be transmitted to the external network 30 or designated to be transmitted to the internal network (such as the Wi-Fi network L1 between the mobile device 10 and the digital camera 20).

In step S260, the virtual private network module 11 revises the initial routing table to generate an updated routing table, and designates that the packet is transmitted to the network destination through the mobile network L2 by using the updated routing table.

In one embodiment, in step S260, the virtual private network module 11 revises the initial routing table according to the network destination of the packet and a transmission path of the designated mobile network L2 so as to generate the updated routing table. Hence, when the virtual private network module 11 determines that the network destination of the packet is directed to a host of the external network, the virtual private network module 11 can designate the mobile network L2 having a stable transmission speed to transmit the packet. For example, the mobile device 10 transmits the packet to the base station 32 of the external network 30 through the mobile network L2.

In one embodiment, in step S260, when the mobile device 10 is connected both to the Wi-Fi network L1 and to the mobile network L2, the mobile device 10 selects to transmit the packet through the mobile network L2. In greater detail, by using the virtual private network module 11 to revise the initial routing table so as to generate the updated routing table and to designate that the packet is transmitted to the network destination through the mobile network L2 according to the updated routing table, the mobile device 10 is allowed to select the mobile network L2 to transmit the packet when being connected both to the Wi-Fi network L1 and to the mobile network L2. For example, the packet is transmitted to the external network 30 through the mobile network L2. Accordingly, the problem of that the mobile device 10 cannot transmit the packet to the external network 30 through the digital camera 20, which is not able to serve as the gateway, when the mobile device 10 is connected to the digital camera 20 through the Wi-Fi network L1 is solved.

In step S270, the virtual private network module 11 revises the initial routing table to generate an updated routing table and designates that the packet is transmitted to the network destination through the Wi-Fi network L1 by using the updated routing table. In one embodiment, the virtual private network module 11 revises the initial routing table according to the network destination of the packet and a transmission path of the designated Wi-Fi network L1 so as to generate the updated routing table. Therefore, when the virtual private network module 11 determines that the network destination of the packet is not directed to a host of the external network, the virtual private network module 11 can designate the Wi-Fi network L1 having a lower transmission cost to transmit the packet. For example, the mobile device 10 transmits the packet to the multimedia database of the digital camera 20 through the Wi-Fi network L1.

In step 9280, the virtual private network module 11 transmits the packet according to a routing path recorded in the updated routing table.

In this manner, the mobile device 10 can automatically determine which transmission method (such as the Wi-Fi network L1 or the mobile network L2) should be adopted when being connected to a peripheral device (such as the digital camera 20). In addition, the transmission method 200 may be constructed on the application layer of Android system. For example, applications of the transmission method 200 are developed to be an application program (APP). The above method according to the present disclosure does not need to alter the Android framework, thus providing mobile phone software developers with more flexible application methods.

Figure 3:
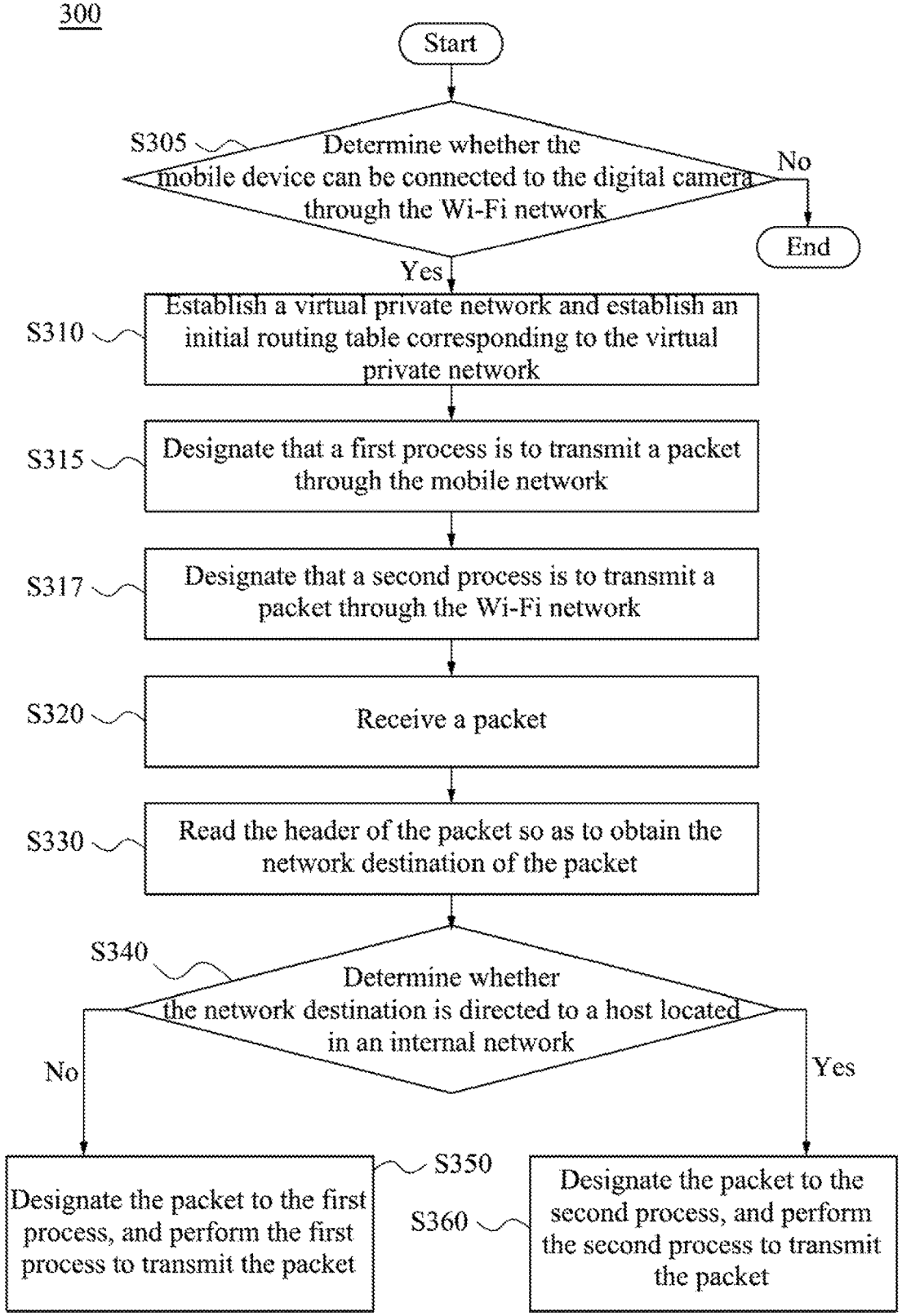
FIG. 3 depicts a flowchart of the transmission method according to another embodiment of this invention.

A description is provided with reference to FIG. 3. FIG. 3 depicts a flowchart of the transmission method 300 according to another embodiment or this invention. Since steps S305, S310, S320, S330, S340 in FIG. 3 are respectively similar to steps S205, S210, S220, S230, S250 in FIG. 2, a description in this regard is not provided.

In step S315, the virtual private network module 11 designates that a first process is to transmit a packet through the mobile network L2.

In one embodiment, after the virtual private network module 11 establishes the virtual private network and establishes the initial routing table corresponding to the virtual private network, a process can be triggered, such as the first process, and the first process is defined as transmitting the packet through the mobile network L2.

In step S317, the virtual private network module 11 designates that a second process is to transmit the packet through the Wi-Fi network L1.

In one embodiment, after the virtual private network module 11 defines the first process, another process can be triggered, such as the second process, and the second process is defined as transmitting the packet through the Wi-Fi network L1.

In one embodiment, step S317 may be performed before step S315, or may be performed simultaneously with step S315.

Then, in steps S320-S330, the packet receiving module 12 receives a packet (such as a newly received packet) and reads a header of the packet to obtain a network destination of the packet, and then transmits the packet and the network destination to the virtual private network module 11.

In step S340, the virtual private network module 11 determines whether the network destination is directed to a host located in an internal network. If it is determined that the network destination is not directed to the host located in the internal network, step S350 is performed. If it is determined that the network destination is directed to the host located in the internal network, step S360 is performed.

In step S350, the virtual private network module 11 designates the packet to the first process, and performs the first process to transmit the packet. Accordingly, the packet can be transmitted to the network destination (such as the base station 32) through the mobile network L2.

In step S360, the virtual private network module 11 designates the packet to the second process, and performs the second process to transmit the packet. Accordingly, the packet can be transmitted to the network destination (such as the digital camera 20) through the Wi-Fi network L1.

In summary, the technical solution according to the present disclosure overcomes the problem of that the electronic device running Android operation system possibly cannot transmit the packet to the Internet after the electronic device is connected to the other peripheral device. In addition, the present invention can allow the electronic device to automatically select the suitable transmission path through applying the virtual private network to collect and filter the data received or transmitted by the electronic device depending on different operation environments.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission method applied to an electronic device comprising:
    establishing a virtual private network (VPN) and establishing an initial routing table corresponding to the virtual private network;
    receiving a packet and obtaining a network destination of the packet;
    determining whether the network destination is directed to a host located in an internal network; and
    transmitting the packet directly according to a first process or revising the initial routing table to generate an updated routing table and then transmitting the packet according to the updated routing table if it is determined that the network destination is not directed to the host located in the internal network;
    wherein determining whether the network destination is directed to the host located in the internal network comprises:
        determining whether the network destination exists in the initial routing table; and
        determining whether the network destination is directed to the host
    located in the internal network if it is determined that the network destination does not exist in the initial routing table.

2. The transmission method of claim 1, wherein when the electronic device is connected both to a Wi-Fi network and to a mobile network, the electronic device selects to transmit the packet through the mobile network.

3. The transmission method of claim 1, wherein the electronic device transmits the packet to a multimedia database through a Wi-Fi network.

4. The transmission method of claim 1, further comprising the following steps after the step of receiving the packet and obtaining the network destination of the packet:
    transmitting the packet directly according to a routing path recorded in the initial routing table if it is determined that the network destination exists in the initial routing table, wherein the routing path comprises designating a Wi-Fi network or a mobile network to transmit the packet.

5. The transmission method of claim 4, further comprising the following steps after the step of determining whether the network destination is directed to the host located in the internal network:
    designating a routing path of the packet to the mobile network, revising the initial routing table according to the network destination of the packet and the designated routing path to generate the updated routing table and designating that the packet is transmitted to the network destination through the mobile network by using the updated routing table if it is determined that the network destination does not exist in the initial routing table and if it is determined that the network destination is not directed to the host located in the internal network; and designating a routing path of the packet to the Wi-Fi network, revising the initial routing table according to the network destination of the packet and the designated routing path to generate the updated routing table and designating that the packet is transmitted to the network destination through the Wi-Fi network by using the updated routing table if it is determined that the network destination does not exist in the initial routing table and if it is determined that the network destination is directed to the host located in the internal network.

6. The transmission method of claim 1, wherein the step of receiving the packet and obtaining the network destination of the packet further comprises:

reading a header of the packet to obtain the network destination after receiving the packet.

7. The transmission method of claim 6, further comprising the following step before the step of receiving the packet and obtaining the network destination of the packet:

adding the header to the packet, wherein the header provides the network destination.

8. The transmission method of claim 1, further comprising the following steps after the step of establishing the virtual private network and establishing the initial routing table corresponding to the virtual private network:

designating the first process as transmitting the packet through a mobile network; and designating a second process as transmitting the packet through a Wi-Fi network.

9. The transmission method of claim 8, wherein the packet is designated to the first process and the first process is performed to transmit the packet if it is determined that the network destination is not directed to the host located in the internal network; and the packet is designated to the second process and the second process is performed to transmit the packet if it is determined that the network destination is directed to the host located in the internal network.

10. An electronic device comprising:

a virtual private network circuit configured to establish a virtual private network (VPN) and establish an initial routing table corresponding to the virtual private network; and a packet receiving circuit configured to receive a packet and obtain a network destination of the packet, and transmit the packet and the network destination to the virtual private network circuit;

wherein the virtual private network circuit determines whether the network destination is directed to a host located in an internal network;

the virtual private network circuit transmits the packet according to a first process or the virtual private network circuit revises the initial routing table to generate an updated routing table and then transmits the packet according to the updated routing table if it is determined that the network destination is not directed to the host located in the internal network;

wherein the virtual private network circuit determines whether the network destination exists in the initial routing table, and if it is determined that the network destination does not exist in the initial routing table, the virtual private network circuit determines whether the network destination is directed to the host located in the internal network.

11. The electronic device of claim 10, wherein when the virtual private network circuit is connected both to a Wi-Fi network and to a mobile network, the electronic device selects to transmit the packet through the mobile network.

12. The electronic device of claim 10, wherein the virtual private network circuit transmits the packet to a multimedia database through a Wi-Fi network.

13. The electronic device of claim 10, wherein the virtual private network circuit transmits the packet according to a routing path recorded in the initial routing table if it is determined that the network destination exists in the initial routing table, wherein the routing path comprises designating a Wi-Fi network or a mobile network to transmit the packet.

14. The electronic device of claim 13, wherein the virtual private network circuit designates a routing path of the packet to the mobile network, revises the initial routing table according to the network destination of the packet and the designated routing path to generate the updated routing table and designates that the packet is transmitted to the network destination through the mobile network by using the updated routing table if it is determined that the network destination does not exist in the initial routing table and if it is determined that the network destination is not directed to the host located in the internal network; and the virtual private network circuit designates a routing path of the packet to the Wi-Fi network, revises the initial routing table according to the network destination of the packet and the designated routing path to generate the updated routing table and designates that the packet is transmitted to the network destination through the Wi-Fi network by using the updated routing table if it is determined that the network destination does not exist in the initial routing table and if it is determined that the network destination is directed to the host located in the internal network.

15. The electronic device of claim 10, wherein the packet receiving circuit is further configured to read a header of the packet to obtain the network destination.

16. The electronic device of claim 10, wherein the virtual private network circuit is further configured to designate the first process as transmitting the packet through a mobile network, and to designate a second process as transmitting the packet through a Wi-Fi network.

17. The electronic device of claim 16, wherein the virtual private network circuit designates the packet to the first process and performs the first process to transmit the packet if it is determined that the network destination is not directed to the host located in the internal network; and the virtual private network circuit designates the packet to the second process and performs the second process to transmit the packet if it is determined that the network destination is directed to the host located in the internal network.

* * * * *